United States Patent
Jahnke et al.

(10) Patent No.: US 7,055,557 B1
(45) Date of Patent: Jun. 6, 2006

(54) DUAL SEAL FILLER NECK WITH AIR RELIEF VALVE

(75) Inventors: Russell Carl Jahnke, Ann Arbor, MI (US); Daniel Lee Pifer, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/073,377

(22) Filed: Mar. 3, 2005

(51) Int. Cl.
*B65B 31/00* (2006.01)

(52) U.S. Cl. .............. 141/59; 141/7; 141/301; 141/350

(58) Field of Classification Search .......... 141/2, 141/4–7, 44–46, 59, 286, 301, 302, 312, 141/346–354; 137/289, 587; 220/86.2
See application file for complete search history.

(56) References Cited

U.S. PATENT DOCUMENTS

| | | | |
|---|---|---|---|
| 5,056,570 A | * | 10/1991 | Harris et al. ............... 141/59 |
| 5,183,087 A | | 2/1993 | Aubel et al. |
| 5,570,672 A | | 11/1996 | Kunimitsu et al. |
| 5,579,742 A | | 12/1996 | Yamazaki et al. |
| 5,769,057 A | | 6/1998 | Hashimoto et al. |
| 5,921,424 A | * | 7/1999 | Palvolgyi ................ 220/86.2 |
| 5,950,655 A | | 9/1999 | Benjey |
| 6,000,426 A | | 12/1999 | Tuckey et al. |

* cited by examiner

*Primary Examiner*—Timothy L. Maust
(74) *Attorney, Agent, or Firm*—Jaquez & Associates; Martin J. Jaquez, et al.; Larry D. Flesner

(57) ABSTRACT

A vehicle refueling system and a vehicle refueling method are disclosed. The refueling system includes a filler cup, a nozzle seal in the filler cup for sealing to a filler nozzle, a vapor re-circulation path from the gas tank to the filler cup, and an air relief module. The air relief module provides additional air to the filler cup region below the nozzle seal when the vapor re-circulation path does not provide sufficient make-up air to the filler nozzle during refueling operations. The refueling method includes providing air through an air relief module when the vapor flow through the vapor re-circulation path is not sufficient to perform a refueling operation.

17 Claims, 6 Drawing Sheets

DUAL SEAL FILLER NECK WITH AIR RELIEF VALVE

BACKGROUND

1. Field

The present disclosure relates in general to vehicle refueling systems, and more particularly to vehicle refueling systems capable of providing air or vapor to the filler nozzle during refueling operations.

2. Description of Related Art

Refueling systems for vehicles designed to reduce emission of fuel vapors during refueling operations are generally well known. Many of these systems employ filler nozzles that require a supply of make-up air, or vapor, to continue delivering fuel, and that automatically shut off when the make-up air supply is cut off or reduced below a minimum level. As used herein, the term "air" shall be understood to refer to both air from the external atmosphere, and to air including a vaporized fuel component, commonly referred to as "vapor." Make-up air is typically supplied by a re-circulation line from the fuel tank. One example of such a refueling system is disclosed in U.S. Pat. No. 5,950,655, entitled "MECHANICAL SEAL ORVR SYSTEM AND CONTROL VALVE,", issued Sep. 14, 1999, referred to hereinafter as the '655 patent. The '655 patent is commonly owned by the assignee hereof, and is fully incorporated by reference herein, as though set forth in full, for its teachings on refueling systems.

In refueling systems such as those described in the '655 patent, a mechanical seal is included in the filler pipe cup that seals to the filler nozzle during refueling operations. This significantly reduces vapor generation during refueling by blocking air from entering the filler pipe and mixing with the fuel being dispensed. This, in turn, reduces the vapor loading presented to the charcoal canister of the fuel system during refueling.

Because the filler nozzles require the presence of make-up air in order to continue dispensing fuel, a vehicle refueling system including a mechanical seal in the filler cup must provide a means for providing make-up air. As noted above, this is typically provided via a re-circulation path from the fuel tank to the filler pipe cup region. The re-circulation path may be designed so that make-up air is provided until the tank is full, at which point the re-circulation path closes, and the fuel dispensing operation is shut down by the filler nozzle due to the lack of make-up air.

It is desirable that the re-circulation path include an air-flow restriction such that the filler pipe cup region maintains a small negative pressure relative to atmospheric pressure and thereby promotes capture of fuel vapors within the vehicle fuel system. However, difficulties can occur when Vapor Vac™ ["Vapor Vac" is a registered trademark of Gilbarco, Inc.] style refueling pumps are used with such a system. Vapor Vac™ style pumps are used in several areas within the United States. Because Vapor Vac™ pumps are designed to perform all of the vapor recovery during operation by pulling vapors into the end of the filler nozzle, a re-circulation path may be unable to provide sufficient make-up air to prevent the filler nozzle from shutting off. In such a scenario, the vehicle's refueling system should provide an additional supply of make-up air. The present disclosure teaches a novel and advantageous system that addresses this need.

SUMMARY

A vehicle re-fueling system and a vehicle refueling method are disclosed. The refueling system includes a filler cup, a nozzle seal in the filler cup for sealing to a filler nozzle, a vapor re-circulation path from the gas tank to the filler cup, and an air relief module. The air relief module provides additional air to the filler cup region below the nozzle seal when the vapor re-circulation path does not provide sufficient make-up air to the filler nozzle during refueling operations. The refueling method includes providing air through an air relief module when the vapor flow through the vapor re-circulation path is not sufficient to perform a refueling operation.

In one embodiment, the air relief module includes an air relief valve (ARV) and a flow-controlled valve actuated by flow through the vapor re-circulation path. In one embodiment, the air relief module is operatively disposed to provide air to the region of the filler cup below the nozzle seal, referred to herein as the "lower cup." In one example of this embodiment, the air relief module may be operatively coupled to the upper cup, i.e., the region of the filler cup above the nozzle seal.

The ARV is operatively disposed within the air relief module to provide air to the lower cup as may be required during refueling operations. The ARV is held sealingly closed by a mechanical means such as a spring. The ARV opens to provide air to the lower cup when there is a selected level of negative pressure within the lower cup as determined by the pressure difference across the ARV.

The air relief module is also operatively disposed to provide a flow of vapor to the lower cup during refueling operations. The air relief module is operatively coupled to receive vapor from a vapor re-circulation line, and to provide the vapor to the lower cup.

In one embodiment, the flow-controlled valve is actuated by the flow of vapor to the lower cup. A flow-sensing means, such as a circular cup or diaphragm, is disposed within the flow path. The flow-sensing means is operatively disposed to actuate the flow-controlled valve by a connecting element. According to one example, the connecting element may comprise a support post coupling a moving valve component to the circular cup or diaphragm. A vapor flow is induced when a negative pressure is present in the lower cup. The vapor flow displaces the flow-sensing means to move the moving valve component into an open position.

The flow-controlled valve is operatively disposed so that when it is in an open position, the ARV is operatively exposed to the negative pressure within the lower cup. Likewise, when the flow-controlled valve is closed, the ARV is isolated from the lower cup, and the ARV, in turn, remains sealingly closed. By this method of operation, the lower cup is provided with make-up air only when a vapor flow through the vapor re-circulation path is present. For many refueling systems (e.g., the system of the incorporated U.S. Pat. No. 4,950,655), the vapor re-circulation path is designed to shut off when the fuel in the tank reaches a desired level. Consequently, the disclosed refueling system advantageously enables the refueling operation to be terminated when the tank is full. Furthermore, the disclosed refueling system advantageously provides air to supplement the vapor re-circulation flow, as may be required by filler pumps such as Vapor Vac™ style pumps.

Another embodiment includes an air relief module having an integrated failed nozzle relief (FNR) valve and ARV module (FNR/ARV module), and a separate vapor re-circulation path. The FNR/ARV module is operatively coupled to the lower cup. In one example of this embodiment, the FNR/ARV module may be operatively coupled to the upper cup.

The FNR valve provides overfill protection, which may occur if the shutoff mechanism in the filler nozzle fails and fuel continues to be dispensed after the tank is full. The purpose of an FNR valve is to prevent excess pressure inside the fuel system from causing damage to the fuel system, or spraying fuel out of the filler pipe.

The FNR valve component in the FNR/ARV module is designed to open when a selected positive pressure occurs in the lower cup. The ARV is designed to open at a selected negative pressure in the lower cup. The ARV may be designed so that the negative pressure in the lower cup becomes more negative when the vapor re-circulation path is closed, thereby enabling the filler nozzle shutoff to be activated and the refueling operation to be terminated when the tank is full.

Yet another embodiment includes an air relief module having the ARV packaged as a separate component, and a separate vapor re-circulation path. In this embodiment, the ARV is operatively coupled to the lower cup. In one example of this embodiment, the ARV may be operatively coupled to the upper cup. As described above, the ARV is designed to open when a selected negative pressure level occurs in the lower cup. The ARV may be designed so that the negative pressure in the lower cup becomes more negative when the vapor re-circulation path is closed, enabling the filler nozzle shutoff to be activated and the refueling operation to be terminated when the tank is full.

A vehicle refueling method includes introducing fuel into a vehicle refueling system and generating a negative pressure inside a lower filler cup region of a filler cup. The method provides a vapor flow from a fuel tank to a lower filler cup region, responsive to the negative pressure inside the lower filler cup region. Air is provided through an air relief module to the lower filler cup region to supplement the vapor flow, responsive to the negative pressure inside the lower filler cup region. An embodiment of the method may include actuating a flow-controlled valve, responsive to the vapor flow, to provide an operative connection between an air relief valve and the lower filler cup region. Another embodiment of the fueling method may include opening a failed nozzle relief valve if a selected level of overpressure occurs in the lower filler cup region.

These and other features of the disclosed vehicle refueling system are described below in more detail.

DESCRIPTION OF THE DRAWINGS

Like reference numbers and designations in the various drawings indicate like elements.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein.

Figure 1:
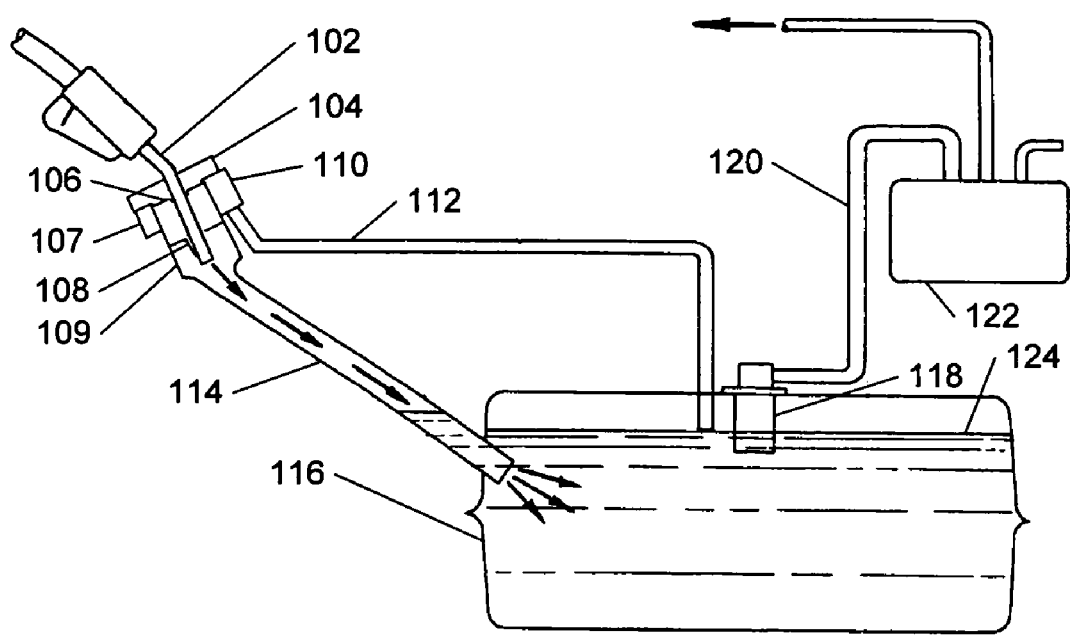
FIG. 1 is a schematic illustration of a vehicle fuel system that includes a refueling system in accordance with the present disclosure, including an air relief module, a failed nozzle relief valve, and a vapor re-circulation path coupled to the air relief module.

FIG. 1 is a schematic diagram illustrating a vehicle fuel system that includes a refueling system in accordance with an embodiment of the present disclosure. During refueling operations, a filler nozzle 102 is inserted into a filler cup comprising an upper filler cup 104 and a lower filler cup 109. The upper filler cup 104 is separated from the lower filler cup 109 by a nozzle seal 106, which fits tightly around the inserted filler nozzle 102 to minimize the escape of fuel vapor during refueling. The lower filler cup 109 also includes a seal door 108 that is forced open when the filler nozzle is inserted therein.

Optionally, a failed nozzle relief (FNR) valve 107 may be coupled to the lower filler cup 109. The FNR valve 107 provides overfill protection, which may occur if the shutoff mechanism in the filler nozzle fails and fuel continues to be dispensed after the tank 116 is full. The FNR valve 107 prevents excess pressure inside the fuel system from causing damage to the fueling system. The FNR valve 107 also prevents spraying of fuel out of the filler pipe. The FNR valve 107 opens when a selected positive pressure occurs in the lower filler cup 109. In one example, the FNR valve 107 is coupled to vent into the upper filler cup 104.

In one embodiment, fuel dispensed from the filler nozzle 102 is conveyed to the tank 116 through a filler pipe 114. A rollover valve 118 is disposed within the tank 116 to control the flow of vapor from the tank 116, through a vent line 120, to a vapor canister 122. The design and operation of rollover valves and vapor canisters is generally well known and therefore is not described in more detail herein.

A vapor re-circulation line 112 conveys vapor from the tank 116 to an air relief module 110. The line 112 may be disposed within the tank 116 so that the flow of vapor ceases when the fuel reaches a full fuel level 124 as shown in the FIG. 1. As described more fully below, this enables the vapor flow to be used to control the shut off function of the filler nozzle 102.

In one embodiment, as illustrated by the FIG. 1, the vapor re-circulation line 112 is operatively coupled to provide vapor to the air relief module 110. The air relief module 110 is also operatively coupled to provide air and vapor to the lower filler cup 109. In one example, the air relief module 110 may be operatively coupled to receive air from the upper filler cup 104. In this embodiment, the air relief module 110 may include a flow-controlled valve (FCV), as described more fully hereinbelow.

Figure 2A:
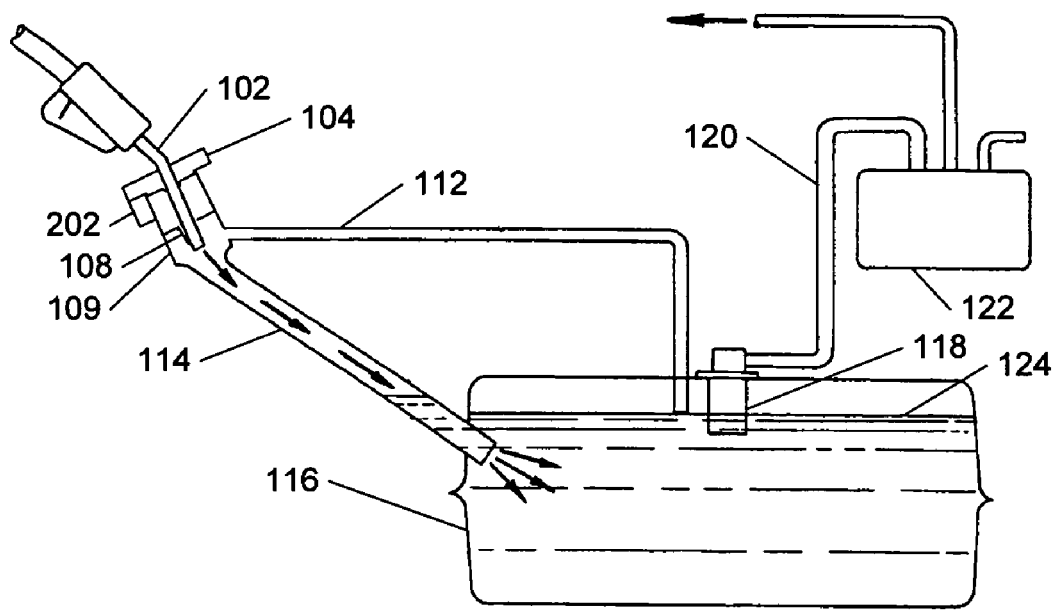
FIG. 2A is a schematic illustration of a vehicle fuel system that includes a refueling system in accordance with a second embodiment of the present disclosure, including an air relief module that incorporates a failed nozzle relief valve, and a vapor re-circulation path that is not coupled to the air relief module.

FIG. 2A illustrates a vehicle fuel system that includes a refueling system in accordance with another embodiment of the present disclosure. According to this embodiment, the air relief module 110 and the FNR valve 107 (shown in FIG. 1) may be configured together as a single FNR/ARV module 202. As described below, the FNR/ARV module 202 includes an air relief valve (ARV).

The FNR/ARV module 202 is operatively coupled to provide air and vapor to the lower filler cup 109. In one example, the FNR/ARV module 202 may be operatively coupled to receive air from the upper filler cup 104. As shown in the FIG. 2A, in this embodiment, the vapor re-circulation line 112 is not coupled directly to the FNR/ARV module 202. A more detailed description of this embodiment is described hereinbelow.

Figure 2B:
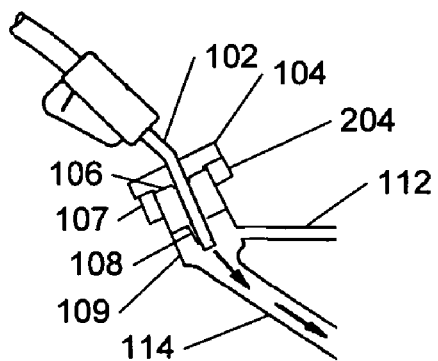
FIG. 2B is a schematic illustration of another embodiment of the disclosed vehicle fuel system, including an air relief module, a failed nozzle relief valve, and a vapor re-circulation path that is not coupled to the air relief module.

FIG. 2B illustrates yet another embodiment. In this embodiment the air relief module 110 is configured as an ARV module 204. The ARV module 204 does not include an FNR valve, but does include an ARV. The ARV module 204 is operatively coupled to provide air to the lower filler cup 109. In one example, the ARV module 204 may be operatively coupled to receive air from the upper filler cup 104. Optionally, the FNR valve 107 may be included according to this embodiment.

As shown in FIG. 2B, in this embodiment, the vapor re-circulation line 112 is not directly coupled to the ARV module 204. A more detailed description of this embodiment is described hereinbelow.

Air Relief Module Including an Air Relief Valve and a Flow Controlled Valve

Figure 3:
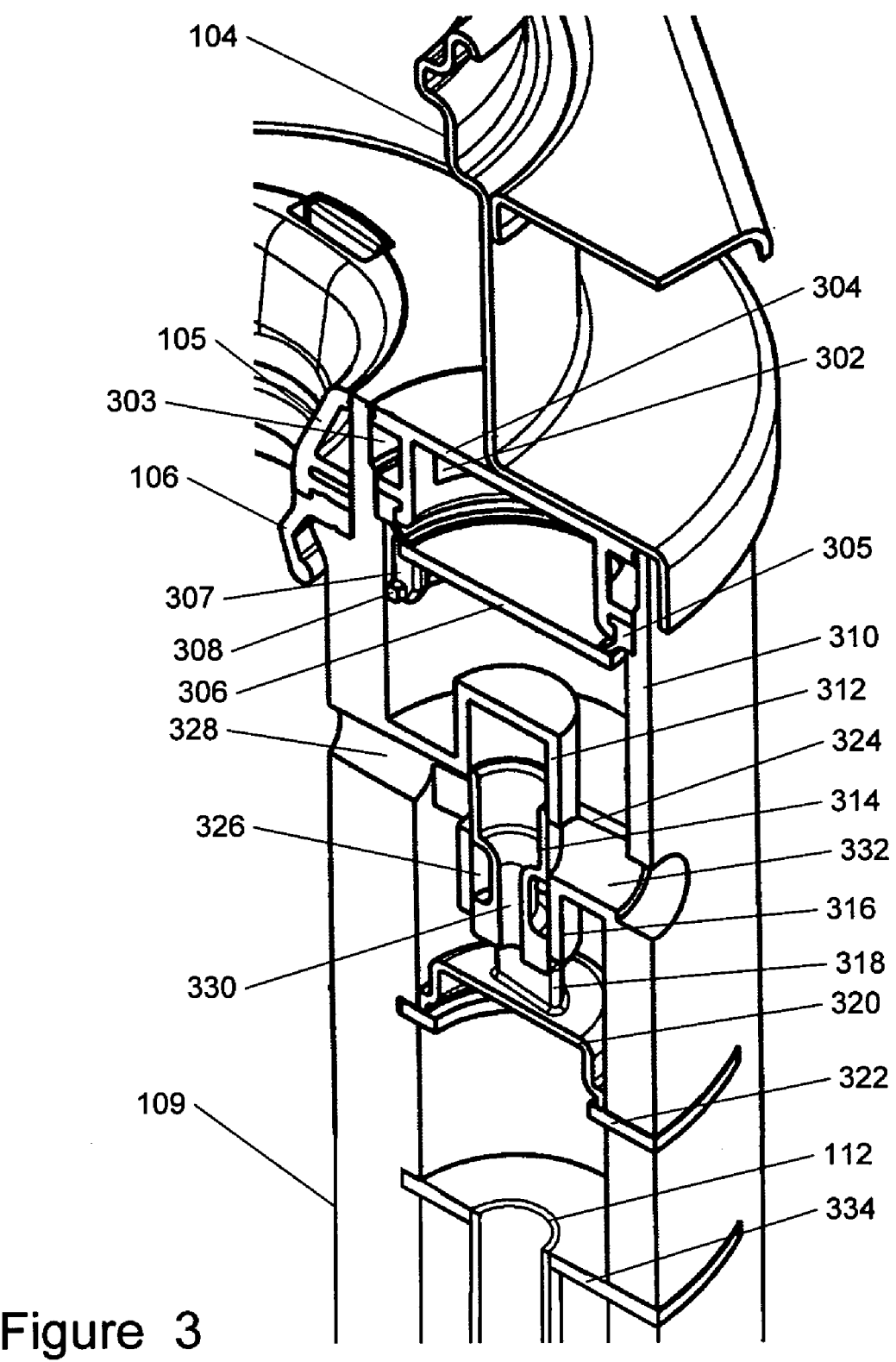
FIG. 3 is a cutaway diagram that illustrates an exemplary inventive air relief module, including an air relief valve and a flow-controlled valve.

Referring now to FIG. 3, a cutaway diagram shows as exemplary air relief module, including elements 304 to 334, inclusive. This exemplary air relief module is referred to hereinbelow as the ARM 304–334. The ARM 304–334 is one example of the air relief module 110 of FIG. 1. The ARM 304–334 air relief valve also includes a closing spring (not shown).

As shown in FIG. 3, in one embodiment, an air intake element 304 may be disposed inside a housing 310. The housing 310 may be fabricated as an integral part of the material which forms the wall of the lower filler cup 109, or it may be produced as a separate component that may be welded or otherwise affixed to the lower filler cup 109 and the upper filler cup 104. A lower structural portion 105 is a part of the upper filler cup 104. The air intake element 304 is disposed to receive air from an annular channel 303 through one or more apertures, such as an aperture 302. As one example, the air intake element 304 may receive air from the region inside the upper filler cup 104. According to this example, the annular channel 303 may be disposed to receive air from the region inside the upper filler cup 104 via a pathway and apertures (not shown). In another example, the annular channel 303 may be disposed to receive air from the outside atmosphere through other apertures and pathways (not shown).

A diaphragm 306 is disposed to form a hermetic seal against an annular seal 305, when the ARV 304–308 is in the closed position. The diaphragm 306 is functionally connected to the hinge 307, including a hinge pin 308. In the closed position, the diaphragm 306 may be held against the annular seal 305 by a closing spring (not shown) or similar resilient element. The hinge 307 and hinge pin 308 enable the diaphragm 306 to open away from the seal 305 when actuated by differential air pressure sufficient to overcome the force of the closing spring (not shown). The ARV 304–308 provides air to the region inside the lower filler cup 109, responsive to a negative pressure in the lower filler cup region, as described below in more detail. Pressure-actuated valves, such as the ARV 304–308, are generally well known, and persons skilled in the mechanical arts will understand that many alternative designs and configurations for the ARV 304–308 are encompassed within the scope of the present teachings.

As shown in FIG. 3, a flow-controlled valve (hereafter FCV 312–322) includes elements 312, 314, 316, 318, 320 and 322. An upper guide section 312 guides a sliding stopper 314, which is also guided by a lower guide section 316. The sliding stopper 314 includes an air-flow channel 326. In one example, the air-flow channel 326 may be annular as shown in the FIG. 3. In one example, the upper guide section 312 and the lower guide section 316 may be fabricated as integrated parts of (e.g., machined from the same stock as) a partition 324.

The sliding stopper 314 is operatively coupled to a flow-responsive cup 320 via a connecting support 318. The flow-responsive cup 320 moves in response to a vapor flow provided by the vapor re-circulation line 112. The re-circulation line 112 is functionally coupled to deliver vapor to the ARM 302–334 through a bottom plate 334. When there is no vapor flow, the cup 320 rests against the seat 322 (as shown in FIG. 3). The flow-responsive cup 320 is an example of a mechanical flow-sensing means suitable for use in an FCV. The flow-responsive cup 320 may be sized, shaped and fitted within the housing 310 to obtain a desired sensitivity to the vapor flow, according to design methods well known to persons skilled in the arts of gas-flow engineering. Persons skilled in the arts of gas-flow engineering will understand that many shapes may be employed for the flow-sensing means, such as the flow-responsive cup 320, such as planar, convex, or concave diaphragms, or any other shape that may be displaced by a flow of gas. More generally, the present teachings encompass any mechanical or electromechanical device that can sense a gas flow and actuate an air relief valve such as the ARV 304–308.

In one exemplary embodiment, the FCV 312–322 operates in the following manner. During refueling, a negative pressure is generated inside the lower cup 109 by Venturi action or by the operation of a Vapor Vac™ style pump. Venturi action is well known to those skilled in the art and therefore is not described further. The negative pressure inside the lower cup 109 is communicated to the flow-responsive cup 320 through an aperture 328. This produces a pressure differential on the flow-responsive cup 320, causing it to move as vapor flow is provided by the vapor re-circulation line 112 in response to the negative pressure. The motion of the flow responsive cup 320 is transmitted to the sliding stopper 314 by the connecting support 318. The sliding stopper 314 includes a hollow channel 330 through its center to allow air to move in and out of the region inside the upper guide section 312, thereby facilitating motion of the stopper 314. When the sliding stopper 314 moves into the upper guide section 312, the air-flow channel 326 is interposed between an aperture 328 and an aperture 332. [Although a hole in the housing 310 is shown juxtaposed to the aperture 332, this hole is blocked by an outer housing (not shown), and has no function. This hole is an artifact of the fabrication process.] The aperture 332 is open to the region between the partition 324 and the ARV 304–308. Consequently, when the FCV 312–322 is actuated in the manner described above, the negative pressure inside the lower cup 109 is communicated to the ARV 304–308. Persons skilled in the mechanical arts will understand that many alternative designs and configurations for the FCV 312–322 are encompassed within the scope of the present teachings.

Exemplary operation of the ARM 304–334 during refueling operations is described below. The refueling operation generates a negative pressure inside the lower filler cup 109. The negative pressure induces a vapor flow into the lower filler cup 109 through the ARM 304–334. The vapor is supplied from the tank 116 through the recirculation line 112. The vapor flow provides make-up air to lower filler cup 109 as required for operation of the filler nozzle 102. The vapor flow also actuates the FCV 312–322, causing it to open, and thereby communicating the negative pressure from the lower filler cup 109 to the ARV 304–308. If the filler nozzle 102 requires more make-up air than is supplied by the vapor flow, the ARV 304–308 supplies the additional air required. The ARV may be designed to open at a selected pressure differential (corresponding to a selected negative pressure inside the lower filler cup 109), according to methods well known to persons skilled in the arts of designing pressure-actuated valves. When the fuel in the tank 116 (FIGS. 1 AND 2A) rises to a full fuel level 124 (FIGS. 1 AND 2A), the vapor flow into the re-circulation line 112 is terminated. This, in turn, causes the FCV 312–322 to close. Optionally, a spring (not shown) may be employed to assist the return of the FCV 312–322 to a closed position when the vapor flow stops. Persons skilled in the mechanical arts will understand that many configurations for the FCV 312–322 are possible, and that a spring to assist the closing process may be included as required. Alternative embodiments may employ gravity, the resilience of a diaphragm, or other means to facilitate closing of the FCV 312–322. When the FCV 312–322 closes, air from the ARV 304–308 is also blocked. Consequently, the filler nozzle 102 (FIGS. 1 AND 2A) will shut off because make-up air is no longer supplied.

Figure 4:
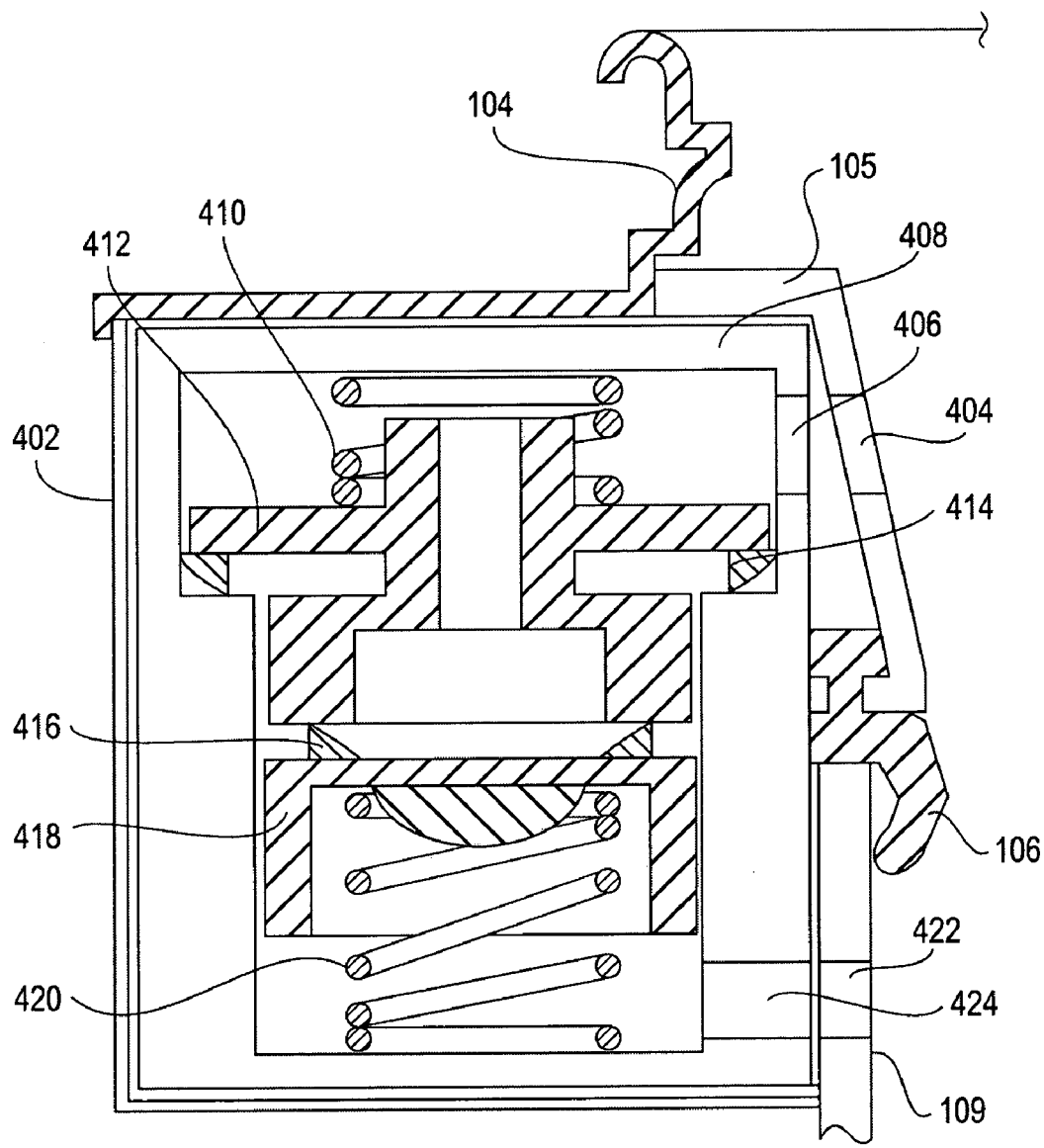
FIG. 4 is a schematic cross-section diagram of an exemplary inventive air relief module, including an air relief valve and a failed nozzle relief valve.

Air Relief Module Including an Air Relief Valve and a Failed Nozzle Relief Valve FIG. 4 is a schematic cross-section diagram showing an exemplary inventive air relief module, including an air relief valve and a failed relief nozzle valve, both of which are operatively conjoined within a common housing 408. This embodiment is referred to hereinbelow as the FNR/ARV 406–424. The FNR/ARV 406–424 is one example of the FNR/ARV module 202 shown in the FIG. 2A. In one embodiment, an external housing 402 enclosing the FNR/ARV 406–424 is conjoined to the upper filler cup 104 and the lower filler cup 109. As shown in FIG. 4, the exemplary FNR/ARV 406–424 includes a housing 408. The housing 408 may include an aperture 406. In one embodiment, the aperture 406 may communicate to a region that is contiguous with the lower structural portion 105 of the upper filler cup 104. The lower structural portion 105 may, in turn, have one or more apertures 404 that provide an air flow pathway to the region inside the upper filler cup 104. This enables air to flow between the FNR/ARV 406–424 and the region inside the upper filler cup 104. Alternative configurations that enable air to flow between the FNR/ARV 406–424 and the external atmosphere may also be implemented. For example, such configurations may include lines or tubes connecting the FNR/ARV 406–424 to the upper filler cup 104, or one or more apertures that connect directly to the external atmosphere.

The housing 408 may also include an aperture 424 juxtaposed to an aperture 422 in the lower filler cup 109. This juxtaposition enables air to flow between the FNR/ARV 406–424 and the region inside the lower filler cup 109. Alternative configurations that enable air to flow between the FNR/ARV 406–424 and the lower filler cup 109 may also be implemented. For example, such configurations may include lines or tubes connecting the FNR/ARV 406–424 to the lower filler cup 109.

As shown in FIG. 4, an FNR includes elements numbered 410 to 414, inclusive. This exemplary FNR is referred to hereinbelow as the FNR 410–414. As shown in FIG. 4, a spring 410 presses against a diaphragm 412. When the FNR 410–414 is closed, an annular seal 414 provides a hermetic seal between the diaphragm 412 and the housing 408. When a selected threshold level of overpressure occurs in the lower filler cup 109, the overpressure is communicated to a sealing side of the diaphragm 412, and the FNR 410–414 opens to relieve the overpressure. The selected threshold level of overpressure may be determined by the sealing-side area of the diaphragm 412 and the pressure exerted by the spring 410, as is well known to persons skilled in the mechanical arts.

As shown in FIG. 4, an ARV includes elements numbered 416 to 420, inclusive. This ARV is referred to hereinbelow as the ARV 416–420. As shown in FIG. 4, a spring 420 presses against a diaphragm 418. When the ARV 416–420 is closed, the annular seal 416 provides a hermetic seal between the diaphragm 418 and a surface of the diaphragm 412. When a selected threshold level of negative pressure occurs in the lower filler cup 109, relative to the atmospheric pressure communicated to a sealing side of the diaphragm 418, the ARV 416–420 opens to provide air to the lower filler cup 109. The air is conveyed through a hole in the diaphragm 412 as shown in the FIG. 4. The selected threshold level of negative pressure may be determined by the sealing-side area of the diaphragm 418 and the pressure exerted by the spring 420, as is well known to persons skilled in the mechanical arts.

During refueling, a negative pressure is generated inside the lower filler cup 109. This negative pressure induces a vapor flow into the lower filler cup 109 through the re-circulation line 112, which is directly connected to the lower filler cup 109 as illustrated in FIG. 2A. The vapor flow provides make-up air to the lower filler cup 109 as required for operation of the filler nozzle 102. If the filler nozzle 102 requires more make-up air than is supplied by the vapor flow (e.g., when a Vapor Vac™ style pump is used for refueling), the ARV 416–420 (FIG. 4) supplies the additional air required. When the fuel in the tank 116 rises to a full fuel level 124, the vapor flow into the re-circulation line 112 is stopped. According to one exemplary embodiment, the ARV 416–420 is designed so that the negative pressure inside the lower cup 109 becomes more negative when the vapor flow provided by the vapor re-circulation line 112 is stopped. This occurs if the amount of air provided by the ARV 416–420 is selectively restricted, so that both air from the ARV 416–420, and vapor from the re-circulation line 112, are required to provide sufficient make up air to the filler nozzle 102. In this example, when the fuel in the tank 116 reaches a full level 124, stopping the vapor flow into the line 112, the filler nozzle 102 is shut off.

Air Relief Module Including an Air Relief Valve as a Separate Component

Figure 5:
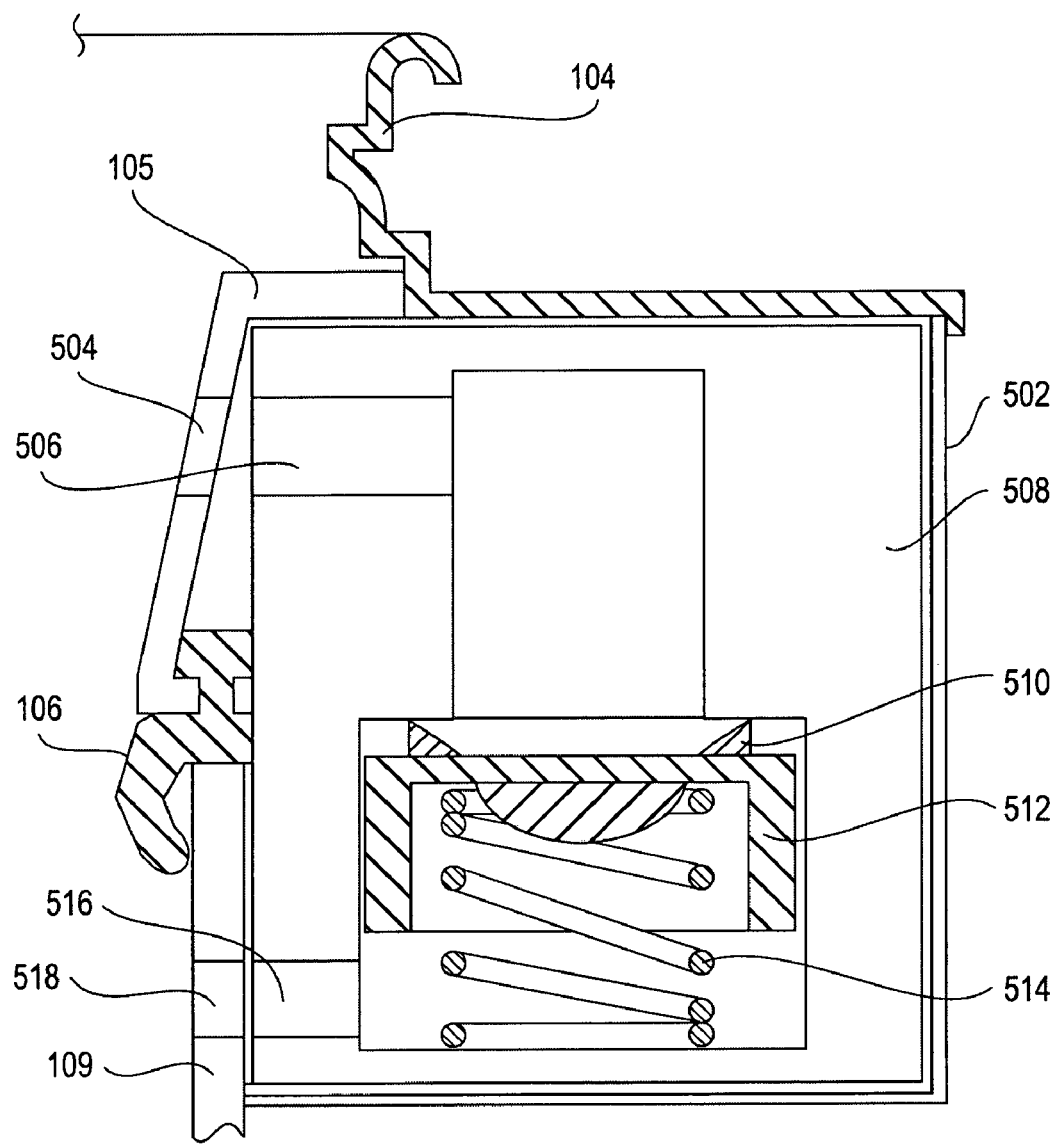
FIG. 5 is a schematic cross-section diagram of another embodiment of an air relief module, wherein the air relief valve is packaged as a separate component.

In another embodiment of the present disclosure, an air relief module includes the ARV packaged as a separate component, as shown in FIG. 2B and FIG. 5. In the embodiment shown in FIG. 5, an ARV includes elements numbered 506 to 516, inclusive, and is referred to herein as the ARV 506–516. The ARV 506–516 is one example of the ARV module 204 described above with reference to FIG. 2B.

Referring now to FIG. 5, in this exemplary embodiment the ARV 506–516 is enclosed within an external housing 502, which is conjoined to both the upper filler cup 104 and the lower filler cup 109. The ARV 506–516 is operatively coupled to provide air to the lower filler cup 109. In one example, the ARV 506–516 may provide air flow to the lower filler cup 109 through juxtaposed apertures 516 and 518, as shown in FIG. 5. Alternative configurations that enable air to flow between the ARV 506–516 and the lower filler cup 109 may also be implemented. For example, such configurations may include lines or tubes connecting the ARV 506–516 to the lower filler cup 109.

In one example, the ARV 506–516 may be operatively coupled to receive air from the upper filler cup 104. The ARV 506–516 may be directly conjoined to the upper filler cup 104, and receive air flow through an aperture 506 to a region contiguous with the lower structural portion 105 of the upper filler cup 104. In turn, the lower structural portion 105 may include one or more apertures 504 to enable air to be received from the region inside the upper filler cup 104. Alternative configurations that enable air to flow between the ARV 506–516 and the upper filler cup 104 may also be implemented. For example, such configurations may include lines or tubes connecting the ARV 506–516 to the upper filler cup 104. In yet another alternative configuration, the ARV 506–516 may be disposed to receive air directly from the external atmosphere.

Optionally, the FNR valve 107 (FIGS. 1 AND 2B) may be included as a separate component according to this embodiment. For example, as shown in the FIG. 2B, in this embodiment, the vapor re-circulation line 112 is directly connected to the lower filler cup 109. The vapor flow provides make-up air to the lower filler cup 109 as required for operation of the filler nozzle 102. If the filler nozzle 102 requires more make-up air than is supplied by the vapor flow, the ARV 506–516 (FIG. 5) supplies the additional air that is required.

Referring again to the FIG. 5, the ARV 506–516 includes an annular seal 510 and a diaphragm 512. When the ARV 506–516 is in a closed position, the annular seal 510 provides a hermetic seal between the diaphragm 512 and the housing 508, as shown in FIG. 5. A spring 514 exerts spring pressure sufficient to hold the diaphragm 512 in a closed position. When a selected threshold level of negative pressure occurs in the lower filler cup 109, relative to the atmospheric pressure that is communicated to a sealing side of the diaphragm 512, the ARV 506–516 opens to provide air to the lower filler cup 109. The selected threshold level of negative pressure may be determined by a sealing-side area of the diaphragm 512 and the pressure exerted by the spring 512, as is well known to persons skilled in the mechanical arts.

During refueling operations, a negative pressure is generated inside the lower filler cup 109. The negative pressure induces a vapor flow into the lower filler cup 109 through the recirculation line 112, which is directly connected to the lower filler cup 109 as illustrated in FIG. 2B. The vapor flow provides make-up air to the lower filler cup 109 as required for operation of the filler nozzle 102. If the filler nozzle 102 requires more make-up air than is supplied by the vapor flow, the ARV 506–516 supplies the additional air that is required. When the fuel in the tank 116 rises to a full fuel level 124 (FIGS. 1 and 2A), the vapor flow into the re-circulation line 112 is stopped. According to one exemplary embodiment, the ARV 506–516 is designed so that the negative pressure in the lower cup 109 becomes more negative when the vapor provided by the vapor re-circulation line 112 is stopped. This occurs if the amount of air provided by the ARV 506–516 is selectively restricted, so that both air from the ARV 506–516 and vapor from the re-circulation line 112 are required to provide sufficient make up air to the filler nozzle 102. In this example, when the fuel in the tank 116 reaches a full level 124 (FIGS. 1 AND 2A), stopping the vapor flow into the re-circulation line 112, the filler nozzle 102 shuts off. Pressure-actuated valves, such as the ARV 506–516, are generally well known, and persons skilled in the mechanical arts will understand that many alternative designs and configurations for the ARV 506–516 are encompassed within the scope of the present teachings.

Vehicle Refueling Method Using an Air Relief Module

Figure 6:
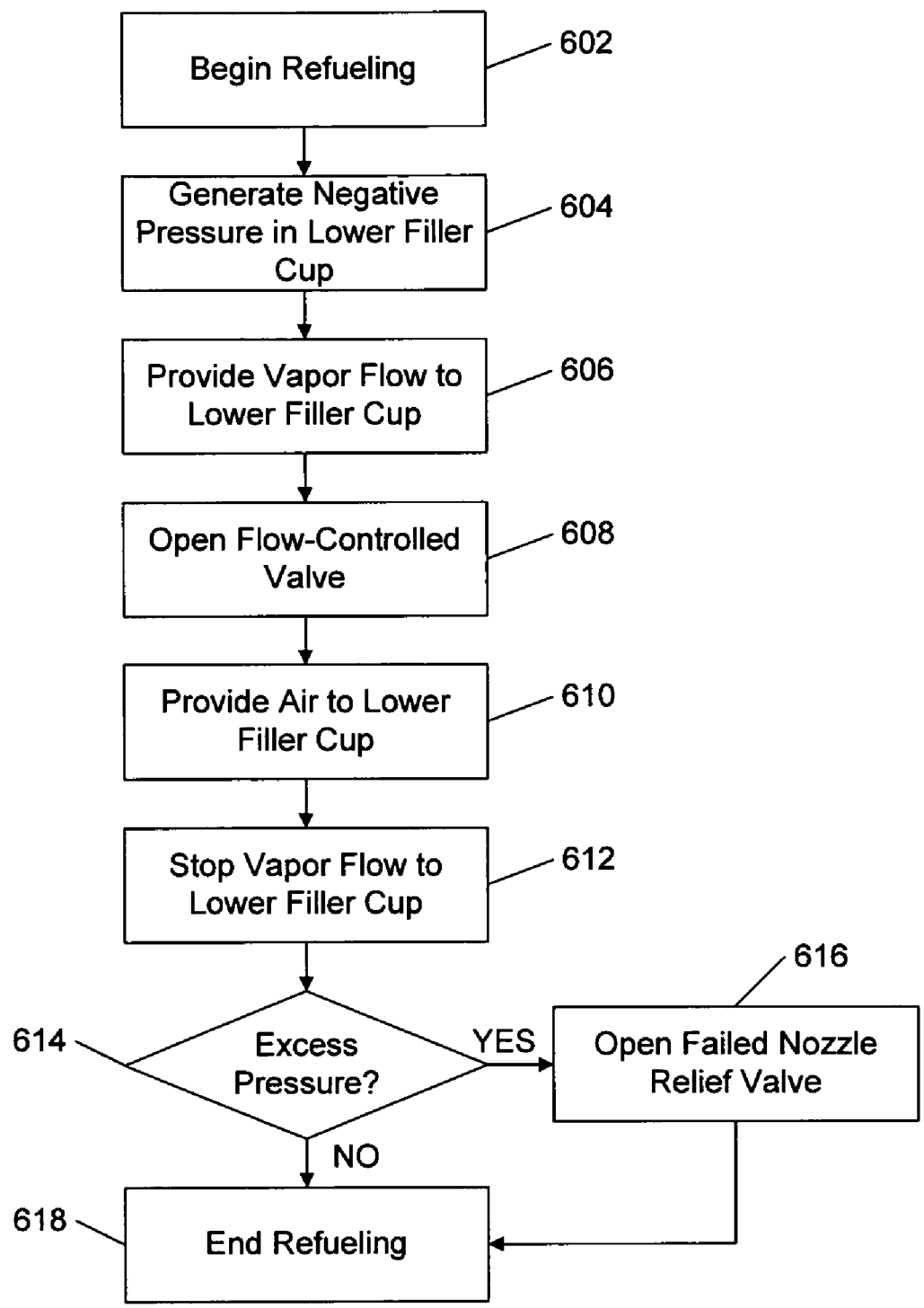
FIG. 6 is a flow chart diagram of a vehicle refueling method using an air relief module, in accordance with an embodiment of the present disclosure.

FIG. 6 is a flow chart diagram of a vehicle refueling method using an air relief module, in accordance with an embodiment of the present disclosure. At a STEP 602, a vehicle refueling operation is begun by introducing the nozzle 102 (FIG. 1) into the lower filler cup 109 and turning on the flow of fuel. The refueling method then proceeds to a STEP 604.

At the STEP 604, the flow of fuel generates a negative pressure in the lower filler cup 109 as described hereinabove.

At a next STEP 606, a vapor flow is provided to the lower filler cup 109 from the tank 116 via the re-circulation line 112, responsive to the negative pressure in the lower filler cup 109.

Subsequent to the STEP 606, in one embodiment of the refueling method, a STEP 608 may be performed. At the STEP 608, a flow-controlled valve, as for example the FCV 312–322 (see FIG. 3), is actuated. If the STEP 608 is performed, the negative pressure from the lower filler cup 109 is operatively communicated via the flow-controlled valve to an air relief valve, as for example the ARV 304–308, thereby allowing the air relief valve to open. The refueling method then proceeds to a STEP 610. In alternative embodiments, the STEP 608 is not performed, and the refueling method proceeds directly from the STEP 606 to the STEP 610.

At the STEP 610, air is provided to the lower filler cup through the air relief module, responsive to the negative pressure generated in the lower filler cup 109. The refueling operation may then continue until a selected fuel level is reached in the tank 116.

When the fuel level in the tank 116 is at or above a selected level, a STEP 612 is executed. At the STEP 612, the vapor flow to the lower filler cup 109 is stopped, as previously described hereinabove.

If, during the refueling operation, a selected threshold level of overpressure occurs in the lower filler cup 109, the overpressure may be communicated to a failed nozzle relief valve, as for example the FNR 107 or the FNR 410–414 (FIG. 4). This occurrence may happen at any time during the refueling operation. For example, this unusual occurrence may be a result of a fuel pump or nozzle malfunction that prevents the fuel flow from shutting off even though make-up air or vapor is not being provided. For simplicity, in the present example the FIG. 6 illustrates this occurrence as potentially happening at a STEP 614 subsequent to the STEP 612. If the selected threshold level of overpressure occurs, the refueling method proceeds to a STEP 616. If the selected threshold level of overpressure does not occur, the method proceeds to a STEP 618.

At the STEP 616, the failed nozzle relief valve is actuated to protect the refueling system as described hereinabove. The refueling method then proceeds from the STEP 616 to the STEP 618.

At the STEP 618, the flow of fuel is stopped. The fuel flow may be stopped either manually by the operator, or more usually by automatic action of the system providing the fuel via the nozzle 102, as described hereinabove. For embodiments that may not include a failed nozzle relief valve, the refueling method proceeds directly from the STEP 612 to the STEP 618.

A number of embodiments of the present inventive concept have been described. Nevertheless, it will be understood that various modifications may be made without departing from the scope of the inventive teachings. For example, it should be understood that the functions described as being part of one module may in general be performed equivalently in another module.

Accordingly, it is to be understood that the inventive concept is not to be limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances the intended distinction between claim features and description features is underscored by using slightly different terminology.

What is claimed is:

1. A vehicle refueling system, comprising:
  a) a filler cup having a nozzle seal for sealing to a filler nozzle, an upper filler cup region positioned above the nozzle seal, and a lower filler cup region positioned below the nozzle seal;
  b) a vapor re-circulation path adapted to receive fuel vapor from a fuel tank and adapted to provide the fuel vapor to the lower filler cup region; and
  c) an air relief module, operatively disposed to receive air from outside the lower filler cup region, wherein the air relief module provides the received air to the lower cup region during a refueling operation to supplement the fuel vapor provided by the vapor re-circulation path, and wherein the air relief module operation is responsive to air pressure within the lower cup region.

2. The refueling system of claim 1, wherein the air relief module comprises:
  a) an air relief valve (ARV), wherein the ARV is operatively disposed to receive air from outside the lower cup region, and wherein the ARV is operatively disposed to provide air to the lower cup region responsive to the air pressure within the lower cup region; and
  b) a flow-controlled valve (FCV) operatively disposed so that the ARV provides air to the lower cup region only when the FCV is open, wherein the FCV includes a flow sensor operatively disposed to sense the flow of vapor from the vapor re-circulation path, and wherein the flow-controlled valve is maintained in an open configuration only when the fuel vapor is flowing from the vapor re-circulation path.

3. The refueling system of claim 2, wherein the flow of vapor is ceased when a fuel level in the fuel tank is at or above a selected level.

4. The refueling system of claim 2, wherein the ARV opens responsive to a detected selected negative pressure within the lower filler cup region.

5. The refueling system of claim 2, wherein the ARV is operatively disposed to receive air from the upper filler cup region.

6. The refueling system of claim 2, wherein the flow sensor comprises a flow-responsive cup.

7. The refueling system of claim 6, wherein the FCV includes a sliding stopper having an air-flow channel, and wherein the flow-responsive cup is operatively coupled to the sliding stopper, and wherein the air-flow channel is operatively disposed to allow air to flow responsive to movement of the flow-responsive cup.

8. The refueling system of claim 1, further comprising a failed nozzle relief (FNR) valve, wherein the FNR valve opens responsive to a detected selected positive pressure within the lower filler cup region.

9. The refueling system of claim 8, wherein the air relief module comprises an air relief valve (ARV), and wherein the ARV is operatively disposed to receive air from outside the lower cup region, and wherein the ARV is operatively disposed to provide air to the lower filler cup region responsive to the air pressure in the lower filler cup region.

10. The refueling system of claim 9, wherein the FNR valve and the ARV are operatively conjoined within a common housing.

11. The refueling system according to claim 8, wherein the flow of vapor within the vapor re-circulation path is stopped when a fuel level in the fuel tank is at or above a selected level, and wherein the air provided by the air relief module during a refueling operation is selectively restricted so that the refueling operation is shut off when the flow of vapor is stopped.

12. A vehicle refueling method, comprising the steps of:
  a) introducing fuel into a vehicle refueling system, wherein the refueling system includes a filler cup having a nozzle seal for sealing to a filler nozzle, an upper filler cup region above the nozzle seal, and a lower filler cup region below the nozzle seal;
  b) generating a negative pressure inside the lower filler cup region;
  c) providing a vapor flow from a fuel tank to the lower filler cup region responsive to the negative pressure inside the lower filler cup region; and
  d) providing air to the lower filler cup region to supplement the vapor flow, wherein the air is provided through an air relief module operatively disposed to receive air from outside the lower filler cup region, and wherein the air relief module is responsive to the negative pressure inside the lower filler cup region.

13. The vehicle refueling method of claim 12, further comprising the step of opening a flow-controlled valve (FCV) responsive to the vapor flow, wherein the FCV is operatively disposed so that the air relief module is operatively connected to provide air to the lower filler cup region only when the FCV is open.

14. The vehicle refueling method of claim 13, further comprising the step of stopping the vapor flow when a fuel level in the fuel tank is detected at or above a selected level.

15. The vehicle refueling method of claim 12, further comprising the step of opening a failed nozzle relief (FNR) valve responsive to a selected positive pressure in the lower cup region.

16. The vehicle refueling method of claim 15, wherein the air relief module comprises:
   a) an air relief valve (ARV), wherein the ARV is operatively disposed to receive air from outside the lower cup region, and wherein the ARV is operatively disposed to provide air to the lower cup region responsive to the negative pressure in the lower cup region; and
   b) the FNR valve, wherein the ARV and the FNR valve are operatively conjoined within a common housing.

17. The vehicle refueling method of claim 12, further comprising the step of stopping the vapor flow when a fuel level in the fuel tank is detected at or above a selected level, and wherein the air provided by the air relief module during the refueling operation is selectively restricted so that the refueling operation is shut off when the flow of vapor is stopped.

* * * * *